H. H. BARBER.
DIGGING DISK FEEDER.
APPLICATION FILED JULY 16, 1917.
1,256,642.
Patented Feb. 19, 1918.
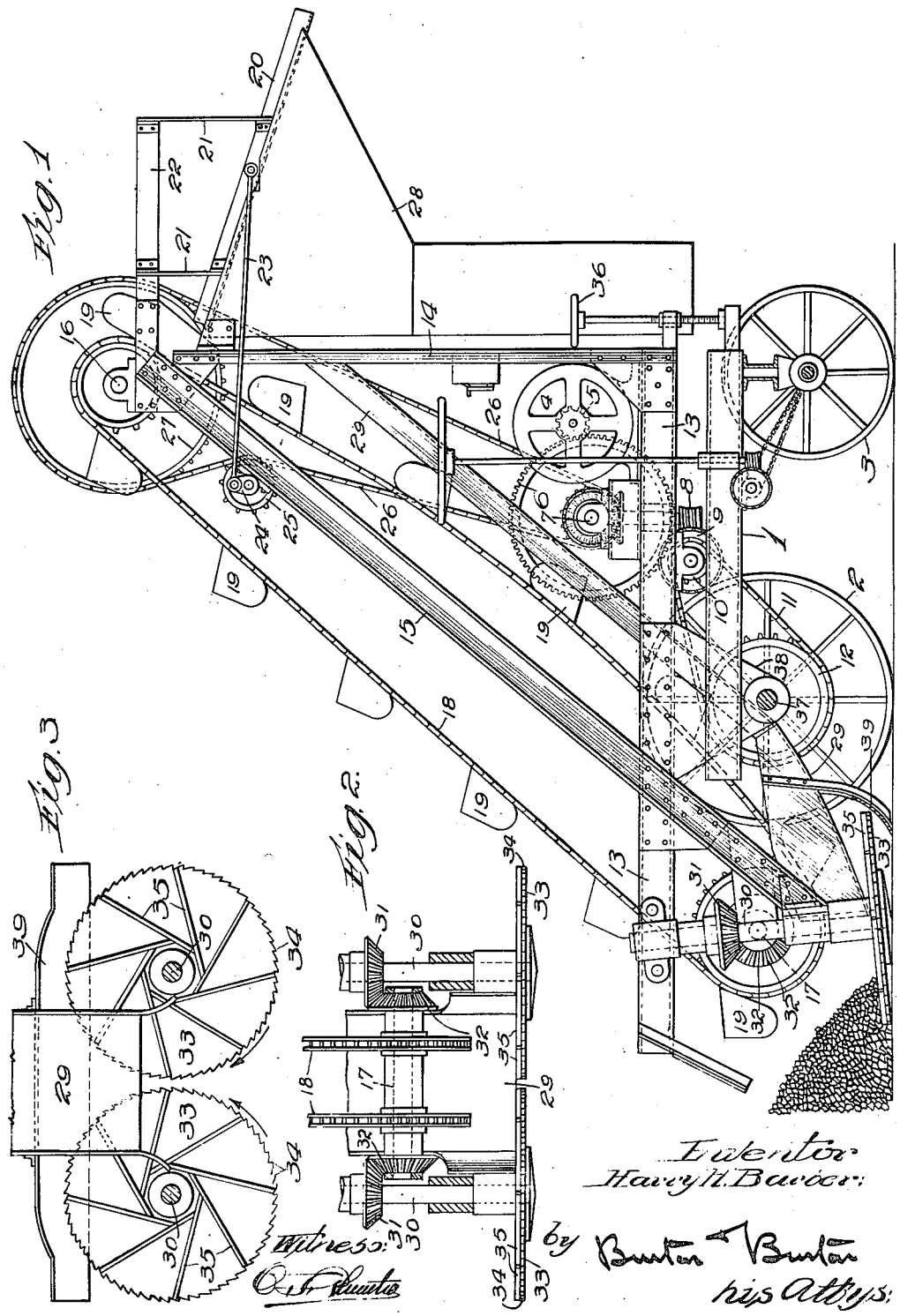

UNITED STATES PATENT OFFICE.

HARRY H. BARBER, OF AURORA, ILLINOIS, ASSIGNOR, BY MESNE ASSIGNMENTS, TO BARBER-GREENE COMPANY, OF AURORA, ILLINOIS, A CORPORATION OF ILLINOIS.

DIGGING-DISK FEEDER.

1,256,642.

Specification of Letters Patent.   Patented Feb. 19, 1918.

Application filed July 16, 1917.   Serial No. 180,734.

*To all whom it may concern:*

Be it known that I, HARRY H. BARBER, a citizen of the United States, residing at Aurora, in the county of Kane and the State of Illinois, have invented certain new and useful Improvements in Digging-Disk Feeders, of which the following is a specification, reference being had to the accompanying drawings, forming a part thereof.

This invention relates to means for agitating, digging or cutting into a pile of bulk material combined with means, such as a conveyer or elevator, for removing such material and transferring it to a car, wagon or other container, or pile. The invention consists in providing one or more approximately horizontal rotating disks or plates associated with the conveyer or elevator near its loading point and adapted to be advanced edgewise into the pile for dislodging material therefrom and delivering it to the conveying means. The invention also includes certain features of construction and certain combinations of parts hereinafter described and shown in the drawings as more particularly indicated by the claims.

In the drawings:

Figure 1 is a side elevation partly in section showing a combination of digging disks and a bucket elevator embodying this invention.

Fig. 2 is a front elevation partly in section, showing the disks and their driving connection.

Fig. 3 is a top plan view of the disks showing their relation to the elevator.

As illustrated in the drawing, the devices embodying this invention are portably mounted on the frame, 1, of a truck provided with driving wheels, 2, and steering wheels, 3, and furnished with a motor shown at 4. Through a pinion, 5, and gear, 6, the motor, 4, drives a countershaft, 7, connected by bevel gears and a worm, 8, with the worm wheel, 9, and sprocket wheel, 10, whose chain, 11, is adapted to transmit motion to the final sprocket, 12, of the driving wheel, 2, for propelling the vehicle or truck in carrying the mechanism to the point of operation and advancing as it operates, if desired.

The elevator, which is of the bucket type, is supported upon a triangular frame having a horizontal member, 13, a vertical member, 14, and an inclined member, 15, carrying the head shaft, 16, and tail shaft, 17, with their associated chain wheels for the conveyer chain, 18, to which the buckets, 19, are fixed. In the particular embodiment illustrated, the buckets, 19, are arranged to discharge on to a shaker screen, 20, supported upon flexible hangers, 21, from a projecting frame member, 22, and arranged to be agitated through a link, 23, connected with a crank arm, 24, on an idler sprocket, 25. The idler sprocket, 25, is associated with the drive chain, 26, which transmits motion from the shaft, 7, to the driving wheel, 27, on the head shaft, 16, of the elevator. A dust chute, 28, is positioned under the inclined screen, 20, to receive the material passing through it, while the screen itself may be understood as discharging into a wagon or car, or on to another pile; but it will be evident that a simple chute may be substituted for the shaker screen for certain kinds of material, if desired.

To protect the motor and gears from dust and particles of material which might otherwise fall from the buckets, 19, in their return travel from the head shaft, 16, to the tail shaft, 17, there is provided a sheet metal guard or trough, 29, extending substantially to the lowest point of travel of the buckets around the tail shaft, 17, and thus serving also as a scoop for collecting material to be picked up by the buckets in their travel. At either side of the lower terminal of this trough or scoop, 29, there is journaled an approximately vertical shaft, 30, carrying a bevel gear, 31, meshing with a gear, 32, on the tail shaft, 17, and fitted at its lower end with a disk, 33, which is thus arranged to rotate in close proximity to the ground and the foot of the pile of bulk material upon which the device is working. The two disks, 33, are thus geared to rotate in opposite directions as indicated by the direction arrows in Fig. 3, the forward portions of their peripheries traveling toward each other and almost into contact at their point of nearest approach which is adjacent the scoop or trough, 29. Preferably the edges of the disks, 33, may be serrated as indicated at 34, to facilitate the agitation of the bulk of material in the pile and enable the disk to be entered under the material more readily and, by virtue of the continuous rotation of the disks, the material which thus becomes lodged on their upper faces will be transferred immediately to the vicinity of the scoop, 29, where it will be picked up by the buckets, 19, in their travel. From Fig. 3, it will be evident that this construction enables the device to work upon a transverse section of the pile over three times the width of the buckets, 19, because the portions of the disks, 33, which are laterally beyond the trough, 29, and buckets, 19, will work in under the pile of material, and by virtue of the rotation of the disks, such material will be moved into the path of the buckets, 19. If desired, the top faces of the disks, 33, may be provided with corrugations or flights, 35, to assist them in gripping and moving the material in their rotation. If the peripheral serrations, 34, of the disks, 33, are made in the form of saw teeth as shown in Fig. 3, it will be evident that the direction of rotation of the disks will enable these teeth to act properly at the extreme lateral margins of the section of the pile upon which the device is working, and they will cut a pathway for the entire machine in the pile, along which it may be advanced either continuously or intermittently by virtue of disengageable clutch connection (not shown) between the counter shaft, 7, and the driving wheels, 2. Thus the employment of the digging disks in pairs, as shown, not only increases the range of operation of the elevator, but automatically clears a path for the continuous advance of the machine without the aid of any hand labor for this purpose.

Preferably, as indicated in Fig. 1, the shafts, 30, are slightly inclined to the vertical, so that the upper surfaces of the digging disks, 33, may slope downwardly toward their extreme forward portions for entering as closely as possible under the foot of the pile of material. This angle of approach and the elevation of the extreme forward peripheries of the disks, 33, with respect to the carrying and driving wheels, 2, of the truck, may be varied through a limited range by means of an adjusting wheel, 36, arranged to swing the entire elevator frame about the axle, 37, of the wheel, 2, upon which the elevator frame is rotatively mounted by means of carrying plates, 38, connected to the horizontal frame members, 13. This permits accommodating the disks, 33, to unevenness of ground adjacent to the pile upon which they are to operate, and also allows them to be lifted entirely clear of the ground when the machine is to travel for any considerable distance. The motor, 4, is conventionally illustrated as an electric motor, since for many purposes, as for use in a coalyard, electric power would be available at a series of current taps which might be reached by a flexible cable (not shown);
but it will be obvious that where such power is not available, storage batteries could be provided upon the machine, or a gasolene engine or other prime mover could be substituted.

In handling certain kinds of material it is unavoidable that some of the smaller stuff should drop through between the edges of the two disks, 33, as they approach the trough, 29; however, a curved scraper blade, 39, mounted just back of the disks, 33, and reaching slightly under them, as indicated in Fig. 1, serves to pick up such material from the ground and carry it farther with the advance of the machine, and also causes it to accumulate in a pile so that, after a certain height is reached in such pile, the material is picked up by the rotating disks, 33, and once more fed toward the trough, 29.

I claim:

1. A feeder for bulk material comprising a pair of circular disks mounted to rotate in opposite directions about approximately vertical and parallel axes, the peripheries of said disks traveling toward each other at the side toward the material to be fed, and being relatively thin, whereby they are adapted to enter the mass of said material when the disks are advanced horizontally toward it, the upper surfaces of said disks serving to support the material dislodged from the mass and to remove it therefrom as the disks rotate.

2. A feeder for bulk material comprising a pair of substantially circular feed disks mounted to rotate in opposite directions about approximately vertical and parallel axes, the peripheries of said disks being serrated and traveling toward each other at the side toward the material to be fed, whereby they are adapted to cut into the mass of said material when the disks are advanced horizontally toward it, while the upper surfaces of said disks serve to support the material dislodged from the mass and to pass it therefrom between the axes about which the disks rotate.

3. A feeder for bulk material comprising a pair of disks mounted to rotate in opposite directions about approximately vertical and parallel axes, the peripheries of said disks traveling toward each other at the side toward the material to be fed, and being adapted to enter the mass of said material when the members are advanced horizontally toward it, the upper surfaces of said disks having transverse corrugations for engaging the material thus dislodged from the mass whereby said disks are adapted to convey such material away from the mass as they rotate.

4. A feeder for bulk material comprising a pair of feed members mounted to rotate in opposite directions about approximately vertical and parallel axes, the peripheries of said members traveling toward each other at the side toward the material to be fed and being adapted to enter the mass of said material when the members are advanced horizontally toward it, the upper surfaces of said members serving to support the material dislodged from the mass and to remove it therefrom as the members rotate, and a continuously traveling conveyer arranged to pick up the material thus removed from the mass by the feed member and to transfer it to a farther point of delivery.

5. A feeder for bulk material comprising a pair of feed disks mounted to rotate in opposite directions about approximately vertical and parallel axes, the peripheries of said disks traveling toward each other at the side toward the material to be fed, and being adapted to enter the mass of said material when the disks are advanced against it, whereby the upper surfaces of said disks may serve to support the material dislodged from the mass and to pass it between the said axes of rotation of the disks, and a bucket conveyer arranged with its tail shaft substantially in the plane of said axes and with its buckets mounted to travel between them for picking up the material removed by the feed disks from the mass and transferring it to a farther point of delivery.

6. The combination of a truck, or vehicle, a conveyer mounted thereon adapted to handle bulk material and a pair of feed members mounted at one end of said vehicle for rotation in opposite directions about approximately vertical and parallel axes, the peripheries of said members arranged to travel toward each other at the side away from the vehicle, said members being arranged side by side transversely of the vehicle and their combined width being greater than the width of said vehicle whereby said members are adapted to enter the mass of material edgewise when the vehicle is advanced toward it, their upper surfaces serving to support the material dislodged from the mass and to remove it therefrom, the conveyer being arranged to pick up the material thus removed, the feed members thus cutting a path in the mass of material for the further advance of the vehicle.

In testimony whereof, I have hereunto set my hand at Aurora, Illinois, this 10th day of July, 1917.

H. H. BARBER.